United States Patent
Ibach et al.

(10) Patent No.: US 11,309,984 B2
(45) Date of Patent: Apr. 19, 2022

(54) TCM CONTROL FOR PHYSICAL LAYER ON OTU PORTS

(71) Applicant: Ciena Corporation, Hanover, MD (US)

(72) Inventors: Trevor John Ibach, Manotick (CA); Larry Babineau, Ottawa (CA); Trevor Donald Corkum, Middle New Cornwall (CA)

(73) Assignee: Ciena Corporation, Hanover, MD (US)

( * ) Notice: Subject to any disclaimer, the term of this patent is extended or adjusted under 35 U.S.C. 154(b) by 177 days.

(21) Appl. No.: 16/808,464

(22) Filed: Mar. 4, 2020

(65) Prior Publication Data

US 2021/0281342 A1    Sep. 9, 2021

(51) Int. Cl.
*H04J 3/16*    (2006.01)
*H04J 3/14*    (2006.01)

(52) U.S. Cl.
CPC .............. *H04J 3/1652* (2013.01); *H04J 3/14* (2013.01); *H04J 2203/0051* (2013.01)

(58) Field of Classification Search
CPC ..... H04J 3/1652; H04J 3/14; H04J 2203/0051
See application file for complete search history.

(56) References Cited

U.S. PATENT DOCUMENTS

| | | | |
|---|---|---|---|
| 7,143,161 B2 | 11/2006 | Brissette | |
| 7,257,117 B2 | 8/2007 | Roberts et al. | |
| 7,602,814 B2 | 10/2009 | Meagher et al. | |
| 7,792,044 B2 | 9/2010 | Holness et al. | |
| 7,969,868 B2 | 6/2011 | Liou et al. | |
| 9,088,380 B2 | 7/2015 | Ibach et al. | |
| 2003/0123493 A1 | 7/2003 | Takahashi | |
| 2004/0114924 A1 | 6/2004 | Holness et al. | |
| 2008/0089693 A1 | 4/2008 | El-Ahmadi et al. | |
| 2008/0199183 A1 | 8/2008 | Liu et al. | |
| 2008/0279553 A1 | 11/2008 | Meagher et al. | |
| 2009/0161681 A1 | 6/2009 | Madrahalli et al. | |
| 2009/0232492 A1 | 9/2009 | Blair et al. | |
| 2010/0014857 A1 | 1/2010 | Haas | |
| 2010/0054731 A1 | 3/2010 | Oltman et al. | |

(Continued)

OTHER PUBLICATIONS

International Telecommunication Union, ITU-T G.709/Y.1331, Telecommunication Standardization Sector of ITU, Interfaces for the optical transport network, Jun. 2016, pp. 1-244.

(Continued)

*Primary Examiner* — Hoon J Chung
(74) *Attorney, Agent, or Firm* — Clements Bernard Baratta; Lawrence A. Baratta, Jr.; Christopher L. Bernard (57) ABSTRACT

Systems and methods for Tandem Connection Monitor (TCM) control for the physical layer on Optical Transport Unit (OTU) ports provide the ability of the TCM status to directly control client laser state (on/off) so that protection engines and coordination between modules is not required. The systems and methods include receiving a specific defect such as a Tandem Connection Monitor (TCM) defect or a Server Signal Fail (SSF) defect from interface circuitry; propagating the TCM defect or the SSF defect from the interface circuitry to an interface associated with a modem including a physical port connected to a network; and selectively disabling a laser in the modem based on the specific defect, e.g., the TCM defect or the SSF defect from the interface circuitry.

15 Claims, 6 Drawing Sheets

(56) References Cited

U.S. PATENT DOCUMENTS

| | | |
|---|---|---|
| 2010/0272438 A1 | 10/2010 | Conklin et al. |
| 2011/0013911 A1 | 1/2011 | Alexander et al. |
| 2011/0170859 A1 | 7/2011 | Conklin et al. |
| 2011/0170860 A1 | 7/2011 | Smith et al. |
| 2011/0262128 A1 | 10/2011 | Madrahalli et al. |
| 2011/0274427 A1 | 11/2011 | Madrahalli et al. |
| 2012/0269511 A1 | 10/2012 | Calderon et al. |
| 2013/0114953 A1 | 5/2013 | Moynihan et al. |
| 2017/0353235 A1* | 12/2017 | Hironaka ............. H04B 10/038 |

OTHER PUBLICATIONS

International Telecommunication Union, ITU-T G.798, Telecommunication Standardization Sector of ITU, Characteristics of optical transport network hierarchy equipment functional blocks, Jun. 2017, pp. 1-390.

* cited by examiner

TCM CONTROL FOR PHYSICAL LAYER ON OTU PORTS

FIELD OF THE DISCLOSURE

The present disclosure generally relates to optical networking. More particularly, the present disclosure relates to systems and methods for Tandem Connection Monitor (TCM) control for the physical layer on Optical Transport Unit (OTU) ports.

BACKGROUND OF THE DISCLOSURE

Optical Transport Network (OTN) is defined in, for example, ITU-T Recommendation G.709 (06/16) "Interfaces for the Optical Transport Network (OTN)," ITU-T Recommendation G.798 (12/17) "Characteristics of optical transport network hierarchy equipment functional blocks," etc., the contents of which are incorporated by reference herein. OTN networks and standards employ line and path level protection but may require additional non-standard capabilities for physical layer protection. Optical Data Unit (ODU) and TCM path status typically reflect the status between the origination and termination points of the ODU and TCM path, whereas physical layer protection requires the client status prior to the origination of the path to be communicated to the far end.

Providing signal conditioning at the ODU path layer, as in commonly-assigned U.S. Pat. No. 9,088,380, issued Jul. 21, 2015, and entitled "Optical transport network generic non-client specific protection systems and methods," the contents of which are incorporated by reference herein, allows additional benefits by escalating these client faults to ODU path layer faults so that the far end protection scheme only needs ODU path visibility in order to protect against near end client faults, which is typical in Sub-Network Connection with Non-intrusive end-to-end monitoring (SNC/Ne) protection schemes using standard OTN equipment. The standards-based solution of communicating client faults via the Optical Payload Unit Client Signal Fail (OPU CSF) indication and a replacement signal means that the far end protection scheme needs to terminate the ODU path and OPU layers for each path independently before performing the protection switch. OTN equipment will typically only have this capability after the protected connection function, which is too late for protection purposes.

OPU and payload-based solutions also do not provide any protection signaling capability, as there is no Automatic Protection Switching (APS) channel available at those layers. U.S. Pat. No. 9,088,380 solved this problem by using an ODU path status to communicate the client fault to far end nodes for protection. This enables any subsequent node to use the ODU path status for path protection. But it still means that there is only a single mechanism for communicating the local failures to the far end. Cascaded ODU Path protection schemes could be employed, but they would all be using the same ODU Path status, which does not provide the flexibility of TCMs.

Commonly-assigned U.S. patent application Ser. No. 16/442,669, filed Jun. 17, 2019, and entitled "Generic non-client specific protection via TCM status and enhanced OTN network propagation of client faults," the contents of which are incorporated by reference herein, uses status at a TCM layer to communicate the faults to the far end for triggering a far end protection switch. The TCM layer can be any of TCM1 to TCM6 for the ODU path and can even be communicated in multiple TCM layers simultaneously to allow for far end visibility at multiple points throughout the network. This allows protection to be closed at earlier locations within the provider's network if they so choose. A TCM could be enabled for only a portion of the network, and if protection is closed and the TCM terminated, then subsequent nodes would not experience the failed TCM status. In another embodiment, the present disclosure enhances the ability to propagate client status to the far end, at any, or several, of the ODU Performance Monitoring (PM) or TCM layers within the OTN overhead.

Optical layer protection schemes can be used for client-side optical path protection. Client-side optical path protection provides redundancy for client interface equipment as well as the line between the remote equipment and the OTN networking equipment. For example, in an Optical Protection Switching (OPS) application, in a transmit direction, a transmitted signal is split for two outputs, and, at a receiver, two inputs from the two outputs are switched to provide a single received signal. Here, there is an active optical switch at the receiver, specifically, the optical switch should switch to the other input as soon as it receives a loss of light from a client. The inactive input is not optically coupled to the other, so its laser is not required to be off. Another optical layer protection scheme can include Y-cable protection. As the name "Y-cable" implies, a Y-cable device is configured to split an output of client equipment into the two client interfaces and to couple the client interfaces into a single input to the client equipment. That is, the Y-cable device is configured as a splitter directionally from the client equipment to an OTN network element and as a combiner that provides one of the outputs from the OTN network element for the client equipment. Importantly, there is a requirement to coordinate the laser states on both clients in a Y-cable configuration. That is, in the transmit direction, the Y-cable device can only receive one signal from the other client equipment, so only one transmitter should be active at a time.

Thus, in a Y-cable application, there is a requirement to coordinate the protection engines. However, in an OPS application, the output from each laser can independently trigger a protection switch so the laser state can be controlled based entirely on the network path status and does not need to be coordinated with the other client port.

BRIEF SUMMARY OF THE DISCLOSURE

The present disclosure relates to systems and methods for Tandem Connection Monitor (TCM) control for the physical layer on Optical Transport Unit (OTU) ports. Specifically, the present disclosure provides the ability of the TCM status to control client laser state directly (on/off) so that protection engines and coordination between modules is not required. The present disclosure includes a separate control mechanism in an Optical Tributary Signal (OTSi) function block to control the laser state based on input directly from an Optical Data Unit level k (ODUk) TCM x (where x=1 to 6) function via a management interface. Alternatively, the separate control mechanism can be via a Server Signal Fail (SSF) status from the ODUk TCM x function, bypassing any other ODUk TCM, ODUk, or Optical Transport Unit level k (OTUk) functions to control the laser state. The present disclosure uses the TCM status in a unique manner to directly control the physical layer transmitter. Normally, the laser control input is done from the lowest layer adjacent to the physical layer (e.g., OTU layer for OTU ports). Variously, the present disclosure contemplates use in OPS applications, such as to cause an active optical switch to switch by forcing a loss of light, and the like. That is, the present disclosure includes use of defect indications, such as from a TCM layer, to directly control a laser.

In an embodiment, a network element includes a modem including a physical port connected to a network; processing circuitry communicatively coupled to the modem for implementing a plurality of OTN-related functions; interface circuitry communicatively coupled to the processing circuitry; and an interface in the processing circuitry configured to detect a specific defect from the interface circuitry, wherein the interface is connected to the modem and the modem is configured to selectively disable a laser based on the specific defect from the interface circuitry. The network can include Optical Transport Network (OTN), and the processing circuitry can include an Optical Channel Data Unit level k (ODUk) TCM x function (x=1 to 6) connected to the interface circuitry, and the specific defect can include one of a Tandem Connection Monitor (TCM) defect and a Server Signal Fail (SSF) defect. The ODUk TCM x function can be configured to receive the specific defect from the interface circuitry and provide the specific defect to the modem. The ODUk TCM x function can be configured to receive the specific defect from the interface circuitry, and provide the specific defect to a laser control function that is connected to the modem. The ODUk TCM x function can be configured to propagate an Alarm Indication Signal (AIS) towards the modem, responsive to the specific defect from the interface circuitry, in addition to causing the laser to be disabled. The processing circuitry can further include an Optical Transport Function level k (OTUk) function between the ODUk TCM x function and the modem, wherein the interface can be through the OTUk function. The interface can include software monitoring of the specific defect from the interface circuitry and explicitly controlling the laser based thereon. The interface can include a hardware-based connection connecting a signal of the specific defect from the interface circuitry to laser control.

In another embodiment, an optical modem includes a transmitter; a receiver, wherein the transmitter and the receive include a physical port connected to a network; and a management interface communicatively coupled to processing circuitry for implementing a plurality of network-related functions, wherein the processing circuitry is communicatively coupled to interface circuitry, wherein the management interface is configured to detect a specific defect from the processing circuitry, and the transmitter is configured to selectively disable a laser based on the specific defect. The network can include Optical Transport Network (OTN), and the processing circuitry can include an Optical Channel Data Unit level k (ODUk) TCM x function (x=1 to 6) connected to the interface circuitry, and the specific defect can include one of a Tandem Connection Monitor (TCM) defect and a Server Signal Fail (SSF) defect. The ODUk TCM x function can be configured to receive the specific defect from the interface circuitry and provide the specific defect to the transmitter. The ODUk TCM x function can be configured to receive the specific defect from the interface circuitry, and provide the specific defect to a laser control function that is connected to the transmitter. The ODUk TCM x function can be configured to propagate an Alarm Indication Signal (AIS) to the transmitter, responsive to the specific defect from the interface circuitry, in addition to causing the laser to be disabled. The processing circuitry can further include an Optical Transport Function level k (OTUk) function between the ODUk TCM x function and the modem, wherein the interface can be through the OTUk function. The management interface can include software monitoring of the specific defect from the interface circuitry and explicitly controlling the laser based thereon. The management interface can include a hardware-based connection connecting a signal of the specific defect from the interface circuitry to laser control.

In a further embodiment, a method includes receiving a specific defect from interface circuitry; propagating the specific defect from the interface circuitry to an interface associated with a modem including a physical port connected to a network; and selectively disabling a laser in the modem based on the specific defect from the interface circuitry. The network can include Optical Transport Network (OTN), and wherein the propagating is via processing circuitry that can include an Optical Channel Data Unit level k (ODUk) TCM x function (x=1 to 6) connected to the interface circuitry, and the specific defect can be one of a Tandem Connection Monitor (TCM) defect and a Server Signal Fail (SSF) defect. The ODUk TCM x function can be configured to receive the TCM defect or the SSF defect from the interface circuitry and provide the specific defect to the modem. The ODUk TCM x function can be configured to receive the specific defect from the interface circuitry, and provide the specific defect to a laser control function that is connected to the modem.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 1 and 2 illustrate typical behaviors for signal conditioning and laser control driven by TCM faults, based on the ITU-T models in G.709. Specifically.

FIG. 6 is a block diagram of a controller for the network element of FIG. 5 or the like.

DETAILED DESCRIPTION OF THE DISCLOSURE

Again, the present disclosure relates to systems and methods for Tandem Connection Monitor (TCM) control for the physical layer on Optical Transport Unit (OTU) ports. Specifically, the present disclosure provides the ability of the a specific defect to control client laser state directly (on/off) so that protection engines and coordination between modules is not required. The present disclosure includes a separate control mechanism in an Optical Tributary Signal (OTSi) function block to control the laser state based on input directly from an Optical Data Unit level k (ODUk)

TCM x (where x=1 to 6) function via a management interface. Alternatively, the separate control mechanism can be via a Server Signal Fail (SSF) status from the ODUk TCM x function, bypassing any other ODUk TCM, ODUk, or OTUk functions to control the laser state. As described herein, the teams SSF status and SSF defect are both used—SSF defect means there is a defect indication on the SSF status. The present disclosure uses the TCM status in a unique manner to directly control the physical layer transmitter. Normally, the laser control input is done from the lowest layer adjacent to the physical layer (e.g., OTU layer for OTU ports). Variously, the present disclosure contemplates use in OPS applications, such as to cause an active optical switch to switch by forcing a loss of light, and the like. That is, the present disclosure includes use of defect indications, such as from a TCM layer, to directly control a laser.

Figure 1:
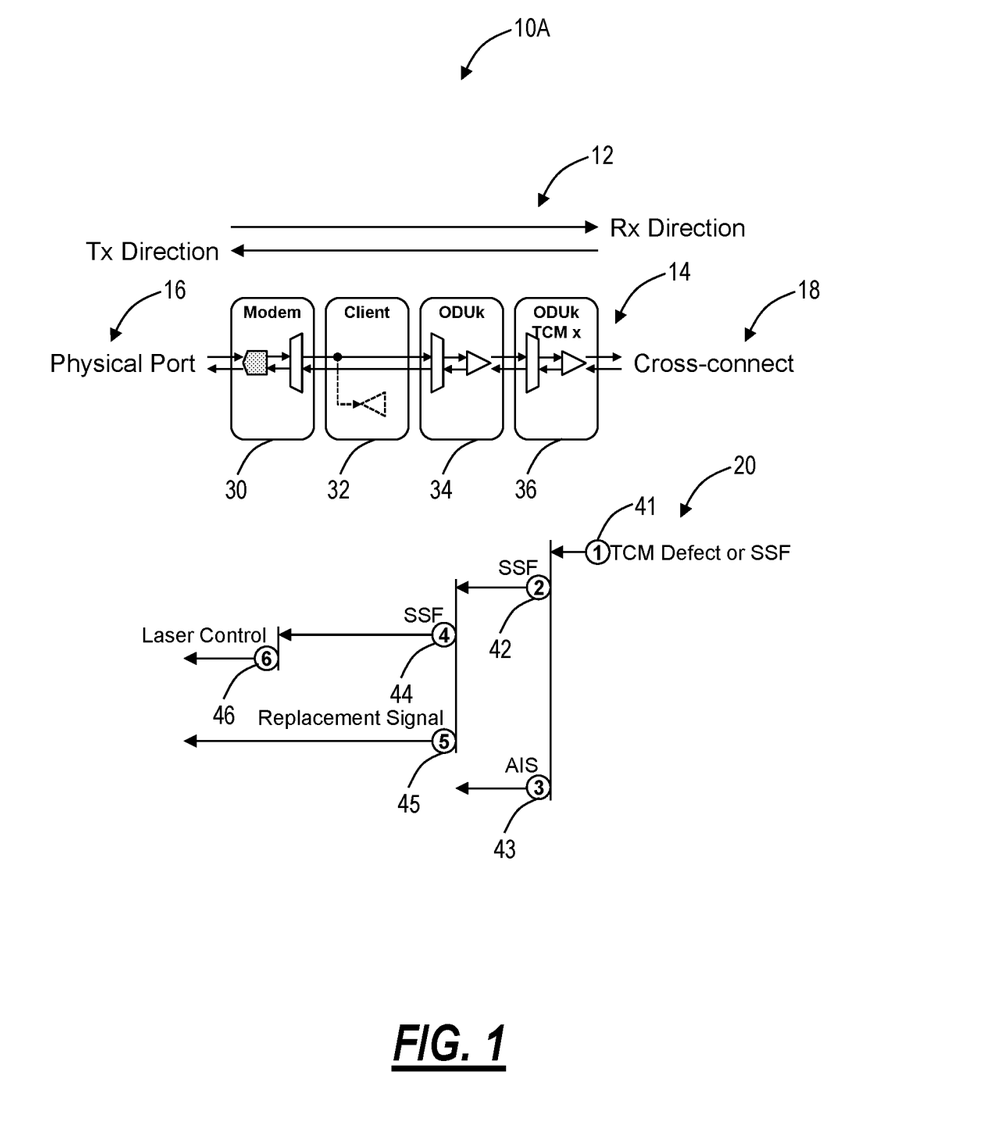
FIG. 1 is a diagram illustrating the model for a non-OTN client that is mapped into an OTN payload for transport.
Figure 2:
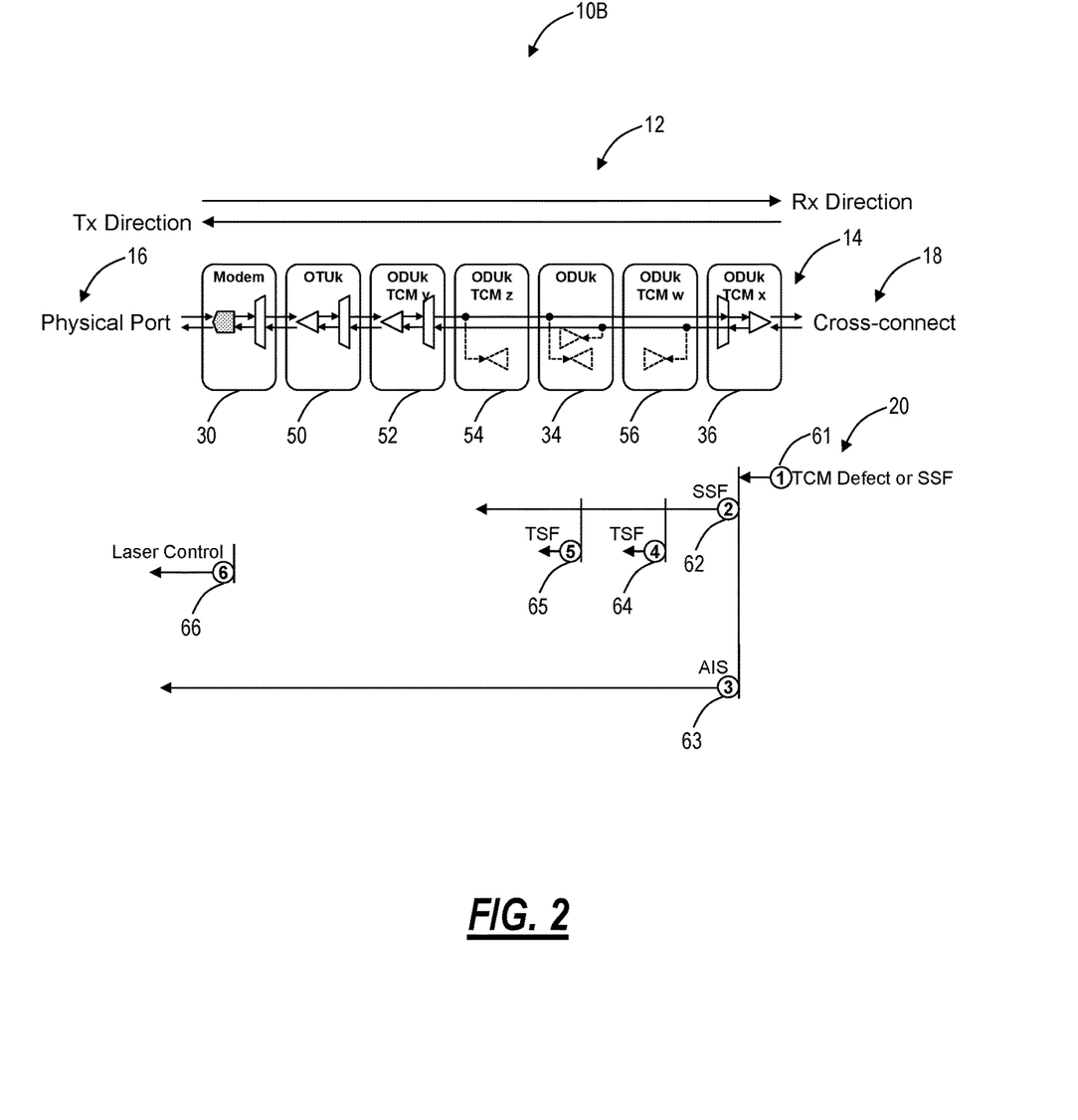
FIG. 2 is a diagram illustrating the equivalent functionality as in FIG. 1 for an Optical Transport Unit level k (OTUk) port, for which the Optical Data Unit level k (ODUk) signal is cross-connected through the device non-intrusively.
Figure 3:
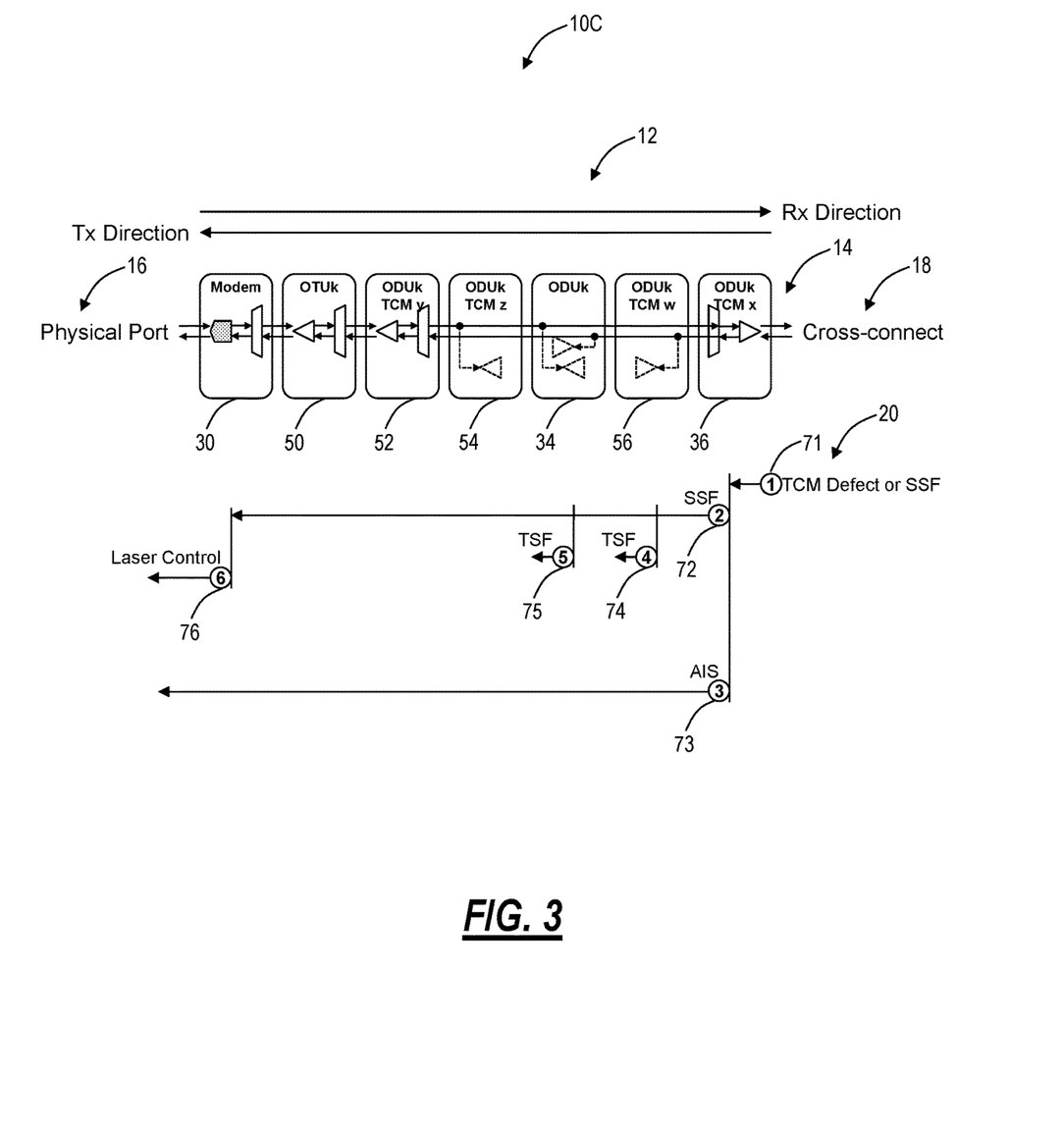
FIG. 3 is a diagram illustrating control using the Server Signal Fail (SSF) status tied directly to the physical laser control layer.
Figure 4:
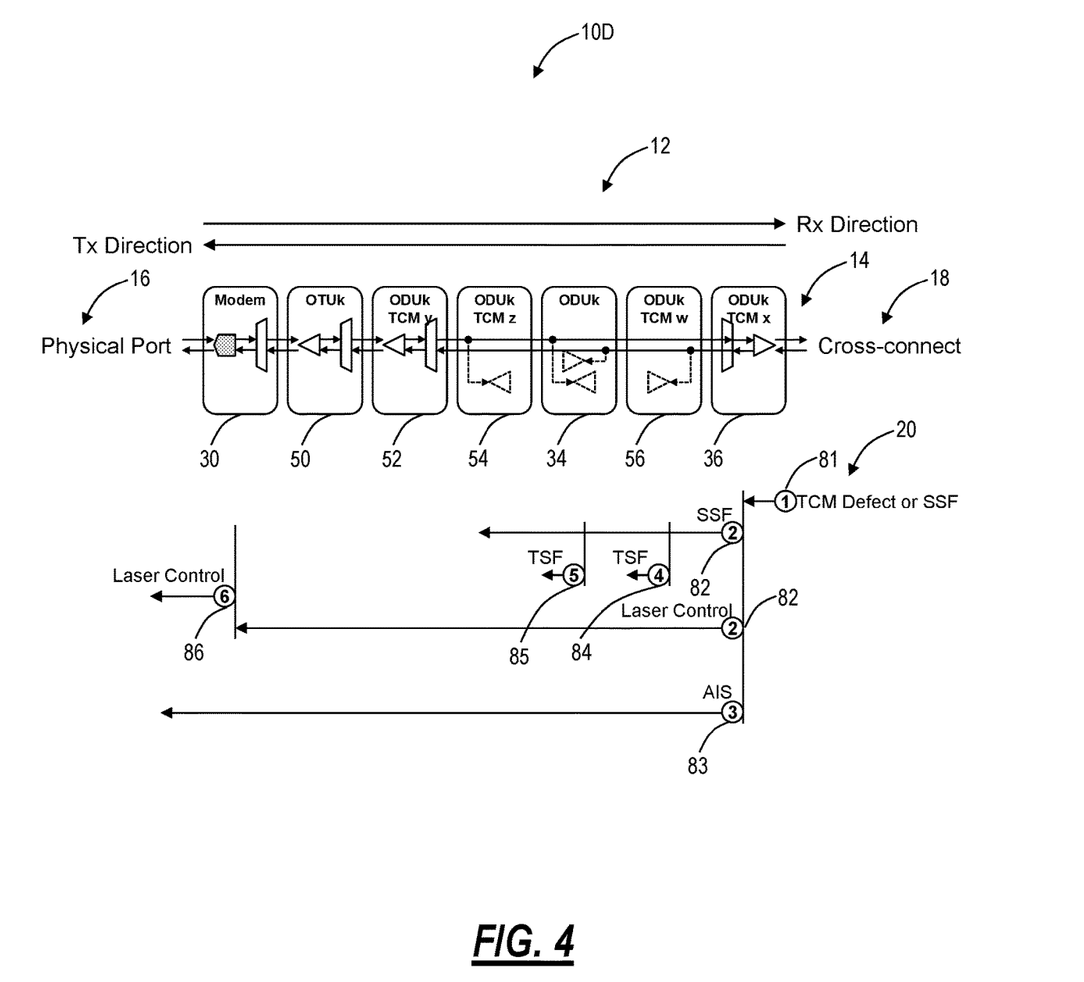
FIG. 4 is a diagram illustrating control using a separate control directly from an ODUk TCM x function to the laser control within an Optical Tributary Signal (OTSi) function block.

FIGS. 1 and 2 illustrate typical behaviors for signal conditioning and laser control driven by TCM faults, based on the ITU-T models in G.709. Specifically, FIG. 1 is a diagram illustrating the model for a non-OTN client that is mapped into an OTN payload for transport. FIG. 2 is a diagram illustrating the equivalent functionality as in FIG. 1 for an Optical Transport Unit level k (OTUk) port, for which the Optical Data Unit level k (ODUk) signal is cross-connected through the device non-intrusively. FIG. 3 is a diagram illustrating control using the SSF status tied directly to the physical laser control layer. FIG. 4 is a diagram illustrating control using a separate control directly from an ODUk TCM x function to the laser control within an OTSi function block.

FIGS. 1-4 are each a diagram of a port in a network element 10 (labeled as network elements 10A-10D in FIGS. 1-4, respectively). The network element 10 is shown transmitting from left-to-right and receiving from right-to-left. This is shown by direction arrows 12. Next, each of FIGS. 1-4 include various entities 14 between a physical port 16 and a cross-connect 18. The physical port 16 includes an external, network-facing, optical interface. The cross-connect 18 includes an internal, network-element facing interface for data to be switched, forwarded, routed, etc. The cross-connect 18 cross-connects the traffic to a different port, which has the same model (including Tx vs. Rx designations) relative to the cross-connect function and its physical port. Also, the cross-connect 18 can be omitted in favor of a line interface such as where the traffic is not cross-connected to different port but where the port is a transponder. Variously, the cross-connect 18 can be interface circuitry that is configured to either cross-connect traffic to a different port or provide the traffic to a line interface. Logically, a network element 10 is configured to transmit/receive data to/from the network via the physical port 16 and to switch/forward data internally in the network element 10 via the cross-connect 18, or to forward data via a line interface such as in a transponder application. The internal switching/forwarding of the data can be between multiple different physical ports 16. Further, FIGS. 1-4 include a defect propagation diagram 20 illustrating how defects are propagated for laser control.

Figure 5:
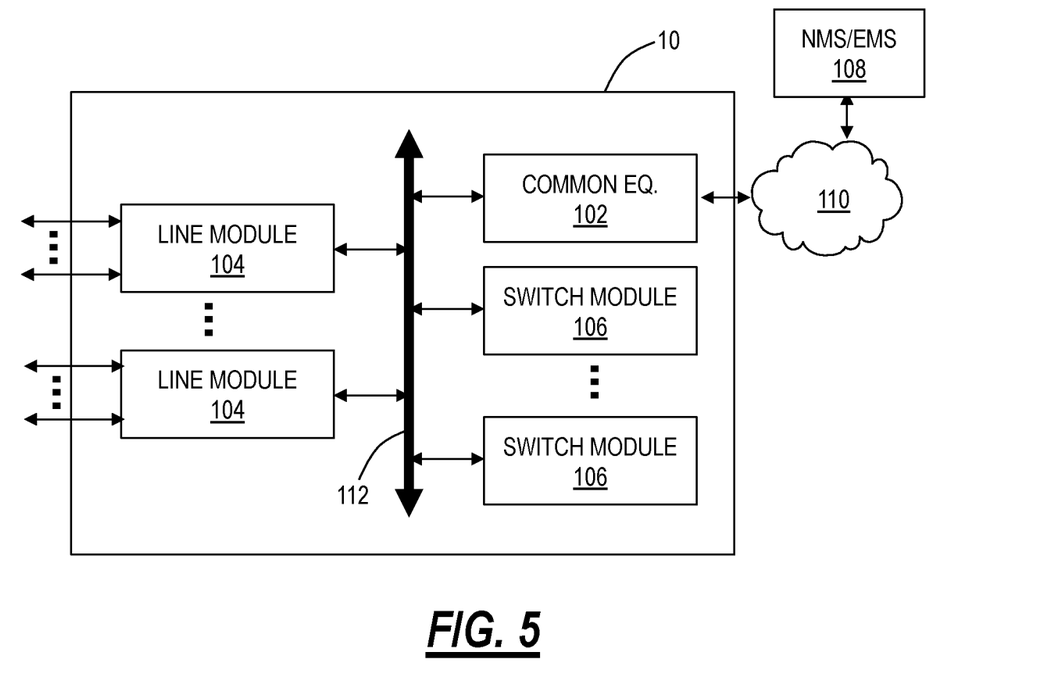
FIG. 5 is a block diagram of a network element for use with the systems and methods described herein.
Figure 6:
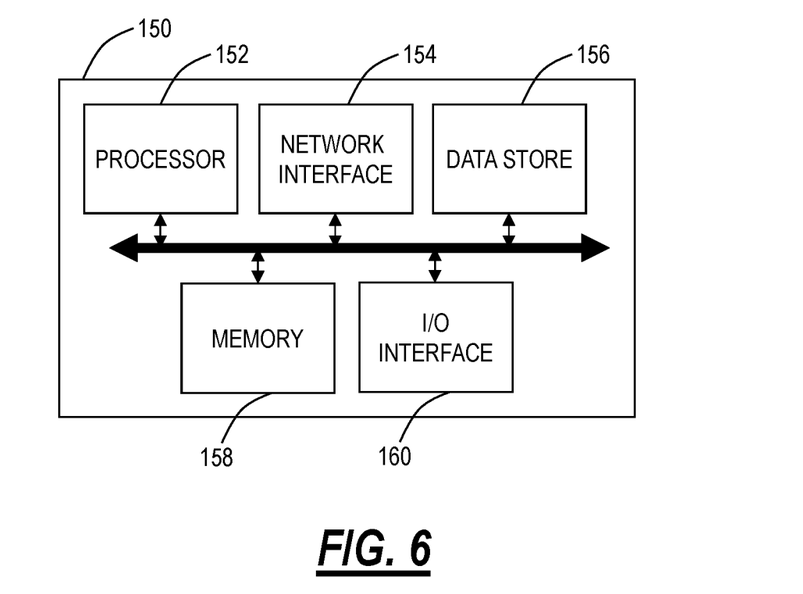

FIGS. 5-6 illustrate an example implementation of a network element 10 and controller. For illustration of the present disclosure, the entities 14 include logical functions that perform physical layer functions and server layer functions. Those skilled in the art will recognize the entities 14 can be implemented via circuitry and the like to perform various functions between the cross-connect 18 and the physical port 16. The objective of the present disclosure is to couple control between a specific defect, such as TCM defects or SSF defect, and the laser control.

Again, FIGS. 1-2 illustrate the typical behaviors for signal conditioning and laser control driven by TCM faults, based on ITU-T models. FIG. 1 specifically illustrates the model for a non-OTN client, which is mapped into an OTN payload for transport. The control of interest occurs in the transmit direction for the physical port 16. For example, in a Y-cable configuration, the control includes turning on/off the laser. This control can also be in the application of an external active switch which detects a loss of light and actively switches to another input, with the loss of light caused by the triggers described herein turning on/off the laser.

In FIG. 1, in a network element 10A, the entities 14 based on the ITU-T modeling include a modem 30, a client function 32, an ODUk trail termination and adaptation function 34, and an ODUk TCM x trail termination and adaptation function 36 (which may also be referred to as an ODUk TCM x function 36). The modem 30 includes a transmitter and receiver and is configured to interface to the physical port 16. The modem 30 includes OTSi modulation/demodulation and client adaptation to/from modulation, which manages and controls the physical layer. The client function 32 monitors the client status in the receive direction. The ODUk trail termination and adaptation function 34 adapts a client signal into/out of the ODU/Optical Path Unit (OPU) payload and originates/terminates the ODUk signal towards the ODUk cross-connect function. The ODUk trail termination and adaptation function 34 can be simply referred to herein as an ODUk function 34. The ODUk TCM x trail termination and adaptation function 36 originates/terminates the TCM x overhead within the ODUk towards the ODUk cross-connect function.

Note that because the ODU Path Monitoring (PM) layer is terminated/originated facing the ODUk cross-connect function (the cross-connect 18), the only possible option for TCM functionality is to have a trail termination and adaptation function which also faces the ODUk cross-connect function. It is not possible to have a TCM monitor function because the ODUk is terminated; therefore, all TCM functionality must be terminated. It is not possible to have a TCM trail termination/adaptation function facing the physical port 16 because the ODUk path does not exist within the physical port 16.

When the TCM has a defect originating from the direction of the cross-connect 18 function, this is the typical functionality that is used to control the laser (of the modem 30) and provide the ability to turn the laser off to trigger a switch at an egress optical layer switch (located at an adjacent network element 10, connected optically via the physical port 16).

With reference to the defect propagation diagram 20 in FIG. 1, a specific defect, such as either a specific TCM defect or a Server Signal Fail (SSF) defect, is present at the ODUk TCM x trail termination and adaptation function 36 (step 41). The TCM asserts an SSF status towards the ODUk trail termination and adaptation function 34 (step 42). The TCM inserts an ODUk Alarm Indication Signal (AIS) towards the ODUk function 34, which terminates where the ODUk terminates (step 43). The ODUk function 34 asserts an SSF status towards the client function 32, based on the SSF status from the TCM function (step 44). The ODUk function 34 also inserts an appropriate client replacement signal towards the client function 32, based on the SSF status from the TCM function (step 45). The SSF status from the ODUk function 34 can be used by the client layer to direct the physical layer to control the laser function directly (on or off) (step 46).

FIG. 2 now shows the equivalent functionality for an OTUk port, in a network element 10B, for which the ODUk signal is cross-connected through the device non-intrusively. In FIG. 2, the entities 14 based on the ITU-T modeling include the modem 30, an OTUk trail termination and adaptation function 50 (which can be referred to as an OTUk function 50), an optional ODUk TCM y (y=1 to 6) trail termination and adaptation function 52, an optional ODUk TCM z non-intrusive monitor function 54 (z=1 to 6), the ODUk function 34, an optional ODUk TCM w non-intrusive monitor function 56 (w=1 to 6), and the ODUk TCM x trail termination and adaptation 36.

Again, the modem 30 includes OTSi modulation/demodulation and client adaptation to/from modulation, which manages and controls the physical layer. The OTUk function 50 includes OTUk trail termination and adaptation, which originates terminates the OTU signal towards the physical port 16. The optional ODUk TCM y trail termination and adaptation function 52 originates/terminates the TCM y overhead within the ODUk towards the physical port 16. The optional ODUk TCM z non-intrusive monitor function 54 monitors ODUk TCM z overhead in the receive direction. The ODUk non-intrusive monitor 34 optionally monitors the ODUk PM overhead in either the receive or transmit direction. The optional ODUk TCM w non-intrusive monitor function 56 monitors ODUk TCM w overhead in the transmit direction. The ODUk TCM x trail termination and adaptation 36 originates/terminates the TCM x overhead within the ODUk towards the ODUk cross-connect 18 function.

Note that because the ODU PM layer is passed non-intrusively to the ODUk cross-connect 18 function, there can be any TCM function associated with this ODUk, as shown in FIG. 2. The present disclosure is associated specifically with the TCM x trail termination and adaptation function 36, which faces the ODUk cross-connect 18 function.

With reference to the defect propagation diagram 20 in FIG. 2, when the TCM has a defect originating from the direction of the cross-connect 18 function, this is the functionality that is used to control the laser and provide the ability to turn the laser off to trigger a switch at an egress optical layer switch.

A specific defect, such as either a specific TCM defect or a Server Signal Fail (SSF) defect, is present at the ODUk TCM x function 36 (step 61). The TCM asserts an SSF status towards the ODU function 34 (step 62). The TCM inserts ODUk AIS towards the ODU function 34. The ODUk is not terminated, so the AIS does not get terminated and goes out through the physical port 16 (step 63). The ODUk TCM w function 56 may raise a Trail Signal Fail (TSF) status based on the SSF status from the ODUk TCM x function 36, but this does not get propagated to other layers (step 64). The ODUk function 34 may raise a TSF status based on the SSF status from the ODUk TCM x function 36, but this does not get propagated to other layers (step 65). The laser control function has no inputs to set the laser state to on/off (step 66). The ODUk TCM z function 54 does not monitor TCM status in the transmit direction, so it cannot provide such an input. The ODUk TCM y trail termination function 52 does not monitor TCM status in the transmit direction, so it cannot provide such an input. The OTUk trail termination and adaptation function 50 does not monitor any ODU PM or TCM status in either direction, as it is the server layer for the ODU PM layer. So, it cannot provide such an input.

The present disclosure provides control and a mechanism for the TCM layers that monitor traffic towards the physical port 16 to be able to control the state of the physical layer (i.e., the laser on the modem 30). The user will have an attribute on the TCM function, which can be explicitly set to turn the laser off when the TCM has a defect or ingress SSF status. Since this behavior may not be desirable by default, it may default to standards-based behaviors, which include if the TCM layer is terminated, causing ODUk AIS to be inserted at that point, or if the TCM layer is non-intrusively monitored, triggering any replacement signal for itself or the rest of the ODUk path.

If this attribute is set to turn the laser off on the physical port 16, the network element 10 needs to support a mechanism to trigger the laser to turn off. This can be either software monitoring the TCM status and explicitly controlling the laser, or a hardware-based solution which ties the SSF/TSF status from the TCM function to the laser control.

FIG. 3 illustrates how that control would look in a network element 10C if the SSF status is tied directly to the physical laser control layer. The network element 10C includes similar entities 14 as the network element 10B. With reference to the defect propagation diagram 20 in FIG. 3, when the TCM has a defect originating from the direction of the cross-connect 18 function, whether a specific defect, such as TCM defect or a SSF, defect is present at the ODUk TCM x function 36 (step 71). The TCM asserts an SSF status towards the ODU function 34 (step 72). The TCM inserts ODUk AIS towards the ODU function 34. The ODUk is not terminated, so the AIS does not get terminated and goes out through the physical port 16 (step 73). The ODUk TCM w function 56 may raise a Trail Signal Fail (TSF) status based on the SSF status from the ODUk TCM x function 36, but this does not get propagated to other layers (step 74). The ODUk function 34 may raise a TSF status based on the SSF status from the ODUk TCM x function 36 (step 75).

Within the physical layer block, the modem 30, there are management interfaces to the adaptation of the client signal to the digital input to modulation/demodulation functions, and to the laser (generation of the optical wave). A management/control function can interact with the SSF status from the ODUk TCM x function 36 and the management interface to the laser in order to control the laser state (step 76). In this case, the SSF status from the ODUk TCM x function 36 bypasses the ODUk TCM y and OTUk trail termination and adaptation functions (steps 74, 75), rather than having those functions process the signal status within the function and interact with the physical layer directly using that status.

FIG. 4 illustrates how that control would look in a network element 10D if there is a separate control directly from the ODUk TCM x function to the laser control within the OTSi function block. With reference to the defect propagation diagram 20 in FIG. 4, when the TCM has a defect originating from the direction of the cross-connect 18 function, whether a specific defect, such as a TCM defect or a SSF, defect is present at the ODUk TCM x function 36 (step 81). The TCM asserts an SSF status towards the ODU function 34 (step 82). The TCM inserts ODUk AIS towards the ODU function 34. The ODUk is not terminated, so the AIS does not get terminated and goes out through the physical port 16 (step 83). The ODUk TCM w function 56 may raise a Trail Signal Fail (TSF) status based on the SSF status from the ODUk TCM x function 36, but this does not get propagated to other layers (step 84). The ODUk function 34 may raise a TSF status based on the SSF status from the ODUk TCM x function 36 (step 85).

Also, at step 82, a laser control function is included that is triggered in the ODUk TCM x function 36 that connects to the laser control within the OTSi function block (modem 30) (step 86).

Using FIG. 1 as a reference, normal applications will control the laser state of the physical port 16 (represented by the Optical Channel (OCh) layer) from the client layer within the diagram. The client layer does have visibility of the SSF status from the ODUk and ODUk TCM x layers. This works for a non-OTN port that terminates the ODUk layer and has a client layer that is mapped into the ODUk layer.

For OTN ports, using FIG. 2 as a reference, the layer that would control the laser state of the physical port 16 is the OTUk layer within the diagram. But that OTUk layer is not mapped into an ODUk layer, but instead is originated towards that physical port 16, so it does not have visibility of the SSF status from the ODUk and ODUk TCM x layers. Thus, there is no normal control mechanism from the ODUk or ODUk TCM x layers, which has the ability to control the laser. The solution is presented in FIG. 3 where the SSF defect indication from the ODUk TCM x function 36 is tied directly to the laser control in the modem 30, i.e., the OTSi function block. The solution is also presented in FIG. 4, where a new laser control function is triggered by the ODUk TCM x function 36 responsive to the SSF defect, and the new laser control function is tied to the laser control in the modem 30, i.e., the OTSi function block.

Example Network Element/Node

FIG. 5 is a block diagram of a network element 10 for use with the systems and methods described herein. In an embodiment, the network element 10 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 10 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the network element 10 can be a system with ingress and egress digital and/or optical signals and switching of channels, timeslots, tributary units, etc. Also, the network element 10 can be a system with ingress and egress of optical signals and switching/routing of wavelengths. Of course, the network element 10 can combine both digital signals and optical signals.

The network element 10 can include common equipment 102, one or more line modules 104, and one or more switch modules 106. The common equipment 102 can include power; a control module; Operations, Administration, Maintenance, and Provisioning (OAM&P) access; user interface ports; and the like. The common equipment 102 can connect to a management system 108 through a data communication network 110. The management system 108 can include a Network Management System (NMS), Element Management System (EMS), a Software-Defined Networking (SDN) controller, or the like. Additionally, the common equipment 102 can include a controller 150, such as illustrated in FIG. 6. The network element 10 can include an interface 112 for communicatively coupling the common equipment 102, the line modules 104, and the switch modules 106 to one another. For example, the interface 112 can be a backplane, midplane, a bus, optical or electrical connectors, or the like. The line modules 104 are configured to provide ingress and egress to the switch modules 106 and to external connections on the links to/from the network element 10. In an embodiment, the line modules 104 can form ingress and egress switches with the switch modules 10+ as center stage switches for a three-stage switch, e.g., a three-stage Clos switch. Other configurations and/or architectures are also contemplated.

The line modules 104 can include optical transceivers, such as the modems 30. Further, the line modules 104 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N x 1.25 Gb/s, and any rate in between as well as future higher rates. The line modules 104 can include wavelength division multiplexing interfaces, short-reach interfaces, and the like, and can connect to other line modules 104 on remote network elements, end clients, edge routers, and the like, e.g., forming connections on links in a network. From a logical perspective, the line modules 104 provide ingress and egress ports to the network element 10, and each line module 104 can include one or more physical ports 16. The switch modules 106 are configured to switch channels, timeslots, tributary units, packets, etc. between the line modules 104. For example, the switch modules 106 can provide wavelength granularity (Layer 0 switching); OTN granularity, Ethernet granularity, and the like. Specifically, the switch modules 106 can include Time Division Multiplexed (TDM) (i.e., circuit switching) and/or packet switching engines.

Those of ordinary skill in the art will recognize the network element 10 can include other components which are omitted for illustration purposes, and that the systems and methods described herein are contemplated for use with a plurality of different network elements with the network element 10 presented as an example type of network element. For example, in another embodiment, the network element 10 may not include the switch modules 106, but rather have the corresponding functionality in the line modules 104 (or some equivalent) in a distributed fashion. In yet another embodiment, the network element 10 may not include modules, but be a single unit, such as a rack-mounted unit, i.e., a "pizza box." For the network element 10, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the network element 10 is merely presented as one example of a network element for the systems and methods described herein.

Controller

FIG. 6 is a block diagram of a controller 150 for the network element 10 or the like. The controller 150 can be part of the common equipment, such as common equipment 102 in the network element 10, part of one of the modules 104, 106, a stand-alone device communicatively coupled to the network element 10 via the DCN 110, etc. The controller 150 can include a processor 152 which is a hardware device for executing software instructions. The processor 152 can be any custom made or commercially available processor, a central processing unit (CPU), an auxiliary processor among several processors associated with the controller 150, a semiconductor-based microprocessor (in the form of a microchip or chipset), or generally any device for executing software instructions. When the controller 150 is in operation, the processor 152 is configured to execute software stored within the memory, to communicate data to and from memory 158, and to generally control operations of the controller 150 pursuant to the software instructions. The controller 150 can also include a network interface 154, a data store 156, memory 158, an I/O interface 160, and the like, all of which are communicatively coupled to one another and to the processor 152.

The network interface 154 can be used to enable the controller 150 to communicate on the DCN 110 or another network. The network interface 154 can include, for example, an Ethernet card (e.g., 10BaseT, Fast Ethernet, Gigabit Ethernet) or a wireless local area network (WLAN) card (e.g., 802.11). The network interface 154 can include address, control, and/or data connections to enable appropriate communications on the network. The data store 156 can be used to store data, such as control plane information, provisioning data, OAM&P data, etc. The data store 156 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 156 can incorporate electronic, magnetic, optical, and/or other types of storage media. The memory 158 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 158 may incorporate electronic, magnetic, optical, and/or other types of storage media. Note that the memory 158 can have a distributed architecture, where various components are situated remotely from one another but may be accessed by the processor 152. The I/O interface 160 includes components for the controller 150 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Process, Network Element, and Modem

Figure 7:
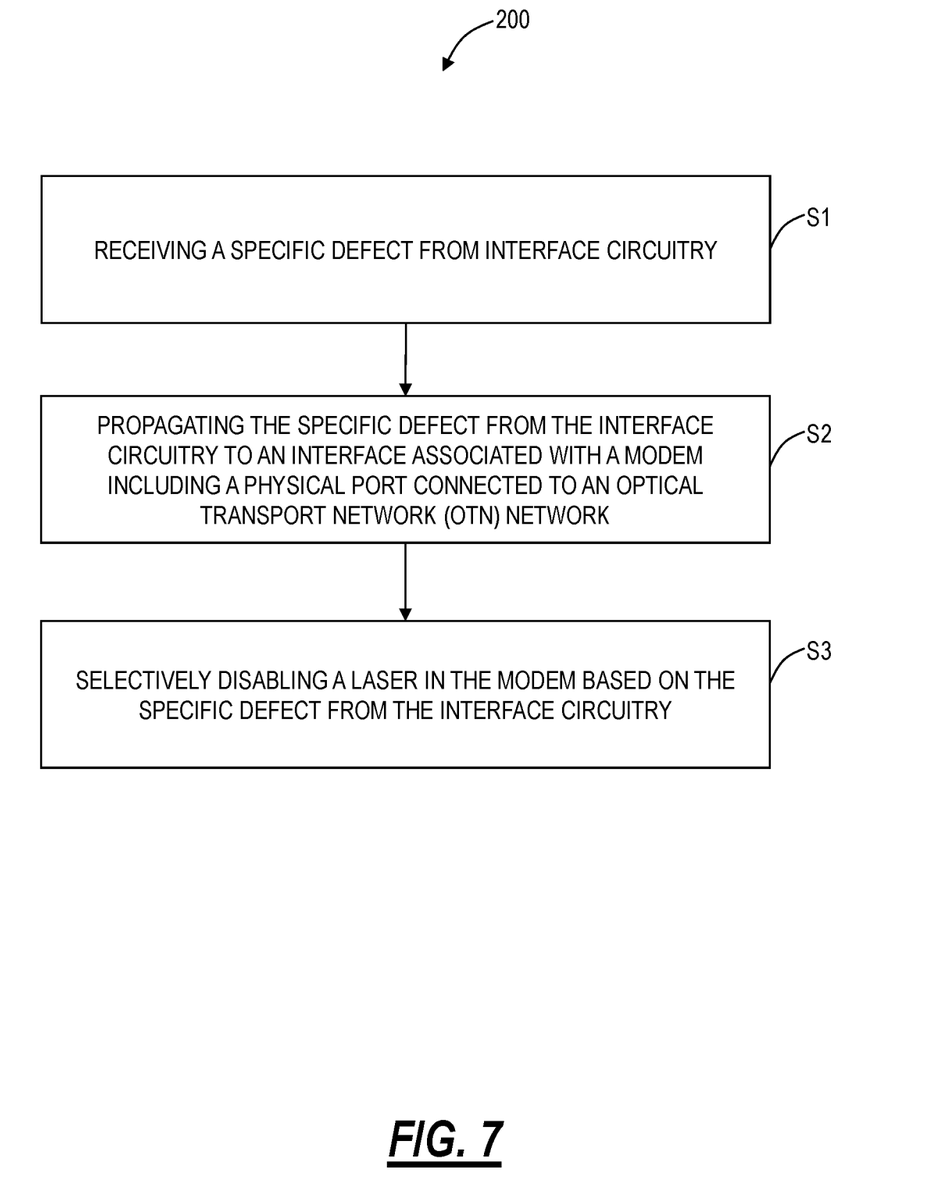
FIG. 7 is a flowchart of a process utilizing TCM defects or SSF defect for laser control.

FIG. 7 is a flowchart of a process 200 utilizing TCM defects or SSF defect for laser control. The process 200 includes receiving a specific defect, such as a Tandem Connection Monitor (TCM) defect or a Server Signal Fail (SSF) defect, from interface circuitry (step S1); propagating the specific defect from the interface circuitry to an interface associated with a modem including a physical port connected to an Optical Transport Network (OTN) network (step S2); and selectively disabling a laser in the modem based on the specific defect from the interface circuitry (step S3).

The propagating can be via processing circuitry that includes an Optical Channel Data Unit level k (ODUk) TCM x function (x=1 to 6) connected to the interface circuitry. The ODUk TCM x function can be configured to receive the specific defect from the interface circuitry and provide to the modem. The ODUk TCM x function can be configured to receive the specific defect from the interface circuitry, and provide the specific defect to a laser control function that is connected to the modem.

In another embodiment, a network element 10 includes a modem 30 including a physical port 16 connected to an Optical Transport Network (OTN) network; processing circuitry communicatively coupled to the modem for implementing a plurality of OTN-related functions; interface 18 circuitry communicatively coupled to the processing circuitry; and an interface in the processing circuitry configured to detect a specific defect, such as a TCM defect or a SSF defect, from the interface circuitry, wherein the interface is connected to the modem and the modem is configured to selectively disable a laser based on the TCM defect or the SSF defect from the interface circuitry.

The processing circuitry can include an Optical Channel Data Unit level k (ODUk) TCM x function (x=1 to 6) connected to the interface circuitry. The ODUk TCM x function can be configured to receive the specific defect from the interface circuitry and provide to the modem. The ODUk TCM x function can be configured to receive the specific defect from the interface circuitry, and provide the specific defect to a laser control function that is connected to the modem. The ODUk TCM x function can be configured to propagate an Alarm Indication Signal (AIS) towards the modem, responsive to the specific defect from the interface circuitry, in addition to causing the laser to be disabled. The processing circuitry can further include an Optical Transport Function level k (OTUk) function between the ODUk TCM x function and the modem, wherein the interface is through the OTUk function. The interface can include software monitoring of the specific defect from the interface circuitry and explicitly controlling the laser based thereon. The interface can include a hardware-based connection connecting a signal of the specific from the interface circuitry to laser control.

In a further embodiment, an optical modem 30 includes a transmitter; a receiver, wherein the transmitter and the receive include a physical port connected to an Optical Transport Network (OTN) network; and a management interface communicatively coupled to processing circuitry for implementing a plurality of OTN-related functions, wherein the processing circuitry is communicatively coupled to interface circuitry, wherein the management interface is configured to detect a specific defect, such as a TCM defect or a SSF, defect from the processing circuitry, and the transmitter is configured to selectively disable a laser based on the specific defect.

The present disclosure generally describes use of a specific defect from a client layer to trigger the laser state (on/off), for the purposes of optical layer protection in a server layer. The specific defect described herein can be a TCM defect or an SSF defect, specifically in the context of OTN. Those of ordinary skill in the art will appreciate other types of defects could be used. Further, other types of client layers can also be used, instead of OTN. For example, other client layers may include, without limitation, Synchronous Optical Network (SONET), Synchronous Digital Hierarchy (SDH), Ethernet, Flexible Ethernet (FlexE), G.mtn (Metro Transport Network), and the like. Each of these would have their own equivalent defects to enable the direct control of the laser state, for optical layer protection applications. Accordingly, the present disclosure contemplates use in such protocols with their specific defects.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element comprising:
    a modem including a physical port connected to a network, wherein the network includes Optical Transport Network (OTN);
    processing circuitry communicatively coupled to the modem for implementing a plurality of OTN-related functions;
    interface circuitry communicatively coupled to the processing circuitry; and
    an interface in the processing circuitry configured to detect a specific defect from the interface circuitry,
    wherein the interface is connected to the modem and the modem is configured to selectively disable a laser based on the specific defect from the interface circuitry, and wherein the processing circuitry includes an Optical Channel Data Unit level k (ODUk) TCM x function (x=1 to 6) connected to the interface circuitry, and the specific defect includes one of a Tandem Connection Monitor (TCM) defect and a Server Signal Fail (SSF) defect,
    wherein the ODUk TCM x function is configured to propagate an Alarm Indication Signal (AIS) towards the modem, responsive to the specific defect from the interface circuity, in addition to causing the laser to be disabled.

2. The network element of claim 1, wherein the ODUk TCM x function is configured to receive the specific defect from the interface circuitry and provide the specific defect to the modem.

3. The network element of claim 1, wherein the ODUk TCM x function is configured to
    receive the specific defect from the interface circuitry, and
    provide the specific defect to a laser control function that is connected to the modem.

4. The network element of claim 1, wherein the processing circuitry further includes an Optical Transport Function level k (OTUk) function between the ODUk TCM x function and the modem, wherein the interface is through the OTUk function.

5. The network element of claim 1, wherein the interface includes software monitoring of the specific defect from the interface circuitry and explicitly controlling the laser based thereon.

6. The network element of claim 1, wherein the interface includes a hardware-based connection connecting a signal of the specific defect from the interface circuitry to laser control.

7. A method comprising:
    receiving a specific defect from interface circuitry;
    propagating the specific defect from the interface circuitry to an interface associated with a modem including a physical port connected to a network, wherein the network includes Optical Transport Network (OTN), and wherein the propagating is via processing circuitry that includes an Optical Channel Data Unit level k (ODUk) TCM x function (x=1 to 6) connected to the interface circuitry, and the specific defect is one of a Tandem Connection Monitor (TCM) defect and a Server Signal Fail (SSF) defect; and
    selectively disabling a laser in the modem based on the specific defect from the interface circuitry, wherein the ODUk TCM x function is configured to propagate an Alarm Indication Signal (AIS) towards the modem, responsive to the specific defect from the interface circuitry, in addition to causing the laser to be disabled.

8. The method of claim 7, wherein the ODUk TCM x function is configured to receive the TCM defect or the SSF defect from the interface circuitry and provide the specific defect to the modem.

9. The method of claim 7, wherein the ODUk TCM x function is configured to
    receive the specific defect from the interface circuitry, and
    provide the specific defect to a laser control function that is connected to the modem.

10. A network element comprising:
    a modem including a physical port connected to a network, wherein the network includes Optical Transport Network (OTN);
    processing circuitry communicatively coupled to the modem for implementing a plurality of OTN-related functions;
    interface circuitry communicatively coupled to the processing circuitry; and
    an interface in the processing circuitry configured to detect a specific defect from the interface circuitry,
    wherein the interface is connected to the modem and the modem is configured to selectively disable a laser based on the specific defect from the interface circuitry, and wherein the processing circuitry includes an Optical Channel Data Unit level k (ODUk) TCM x function (x=1 to 6) connected to the interface circuitry, and the specific defect includes one of a Tandem Connection Monitor (TCM) defect and a Server Signal Fail (SSF) defect, wherein the processing circuitry further includes an Optical Transport Function level k (OTUk) function between the ODUk TCM x function and the modem, wherein the interface is through the OTUk function.

11. The network element of claim 10, wherein the ODUk TCM x function is configured to receive the specific defect from the interface circuitry and provide the specific defect to the modem.

12. The network element of claim 10, wherein the ODUk TCM x function is configured to
receive the specific defect from the interface circuitry, and
provide the specific defect to a laser control function that is connected to the modem.

13. The network element of claim 10, wherein the ODUk TCM x function is configured to propagate an Alarm Indication Signal (AIS) towards the modem, responsive to the specific defect from the interface circuitry, in addition to causing the laser to be disabled.

14. The network element of claim 10, wherein the interface includes software monitoring of the specific defect from the interface circuitry and explicitly controlling the laser based thereon.

15. The network element of claim 10, wherein the interface includes a hardware-based connection connecting a signal of the specific defect from the interface circuitry to laser control.

* * * * *